UNITED STATES PATENT OFFICE.

HENNELL STEVENS, OF BRAZORIA, TEXAS.

IMPROVEMENT IN PROCESSES OF PRESERVING MEATS.

Specification forming part of Letters Patent No. 172,196, dated January 11, 1876; application filed October 11, 1875.

*To all whom it may concern:*

Be it known that I, HENNELL STEVENS, of Brazoria, county of Brazoria and State of Texas, have invented a new and Improved Process of Preparing and Canning Meat for Preserving the same; and I do hereby declare that the following is a full, clear, and exact description thereof.

In preserving edible substances, the prime requisite is the exclusion of air, which is effected more or less perfectly in the various canning processes for fruit, vegetables, &c. It is very difficult, however, to get rid of the last vestige of air, and, in the case of meat and similar substances, the gases contained in the pores of the interior are liable to start up a destructive fermentation, unless removed or neutralized. Many attempts have been made to preserve beef and other meats, none of which has been entirely successful, a large percentage of the product in the best processes being unfit for use. In canning beef it is necessary not merely that the product should be uniformly of good quality, but that it should be attractive in appearance, palatable in taste, and be capable of being used in various ways in cookery, as the appetite soon fails of any one article of diet, no matter how delicious it may be.

In my process for canning meat I endeavor to preserve all the nutriment of the material in the most concentrated form. After the animals are killed and dressed, the carcasses are hung up and allowed to thoroughly cool. When cooled as much as possible the meat is cut from the bones, and these are then boiled for four hours in water in a covered tank heated by a steam-coil, whereby a large amount of gelatine is extracted from the bones, and all the meat and sinews adhering to them are dissolved. The fat is then thoroughly skimmed off, and the liquid, which is already a rich and nutritious broth, is drawn off and poured over the meat, which in the meantime has been cut into small pieces and placed in steam-jacketed copper pans. Covers are placed upon the pans, and steam is turned on so as to maintain a heat of 210° for about two hours, till the meat is thoroughly cooked. The fat which has risen to the top is carefully removed, and the meat is mixed with the necessary seasoning and immediately placed in cans, which are filled as nearly full as possible. As, however, in so complex a substance as meat, the smallest trace of ferment or of nascent oxygen will start decomposition, I add to the cooked meat, just before placing it in the cans, a small proportion of hypophosphite of lime, say at the rate of eight ounces to the one thousand pounds of meat.

This salt, which is tasteless and innocuous, has a very strong attraction for oxygen, with which it combines to form phosphate of lime, which is identical with bone-earth, and of course harmless, if not positively beneficial, to the human economy. By this means I neutralize and absorb any residual air in the cans or the substance of the meat, and insure the keeping of the product during any length of time and in any climate.

The cans after being filled, as described, are soldered up while hot as quickly as possible, and are then placed in a strong iron vessel, which is closed and steam turned on to a pressure of thirty or thirty-five pounds to the square inch. The contents of the cans are thereby raised to a temperature of 300°, which experience has shown will destroy the germs of organic life, and cause the thorough absorption of any contained oxygen by the hypophosphite of lime in solution. It is necessary to turn the steam off and on slowly to prevent the cans from bursting by the pressure.

After the cans are cold, they may be depended on to keep for any length of time, and the product, which is a solid mass at ordinary temperatures, may be sliced and eaten cold, or may be served up in various ways, and will be found a nutritious and palatable food.

By this process beef can be preserved in any climate, and the vast herds of low-priced cattle in Texas and South America can be profitably converted into food for use where meats are scarce and dear.

I am aware that sulphite of soda has been used for the purpose of absorbing oxygen in the process of preserving meat; but this substance will soon oxidize to sulphate of soda, or Glauber salts, which would neither be palatable nor healthful, and, if in any quantity, decidedly purgative; whereas hypophosphite of lime is in itself beneficial, from the phosphorus it contains, and oxidizes to phosphate of lime, which is tasteless and salutary. I therefore do not claim sulphite of soda in the process of preserving meat; neither do I claim, broadly, the use of substances in the process of preserving meat which absorb oxygen.

What I claim is—

1. In the preservation of food, the process of eliminating free oxygen from the same, and preventing putrefaction, by mixing with the food a portion of hypophosphite of lime, whereby the oxygen is absorbed, and the deoxidizing agent itself becomes animal food, substantially as described.

2. The process of preserving meat by cooking the meat removed from the bones of an animal by subjecting it to the action of steam at 210° of heat, or a little below the boiling-point; then treating the cooked meat to a gelatinous broth extracted from the bones and sinews of the bones from which the meat was removed; then treating the meat with hypophosphite of lime immediately before placing it in cans; and, lastly, subjecting the sealed cans containing the meat thus treated to the action of steam at a temperature of not less than 300° of heat, all substantially as and for the purpose described.

HENNELL STEVENS.

Witnesses:
  FRANK W. STEVENS,
  ARTHUR H. STEVENS.